United States Patent [19]

Yasuda

[11] Patent Number: 5,355,153
[45] Date of Patent: Oct. 11, 1994

[54] OPTICAL IMAGE WRITING UNIT HAVING IMPROVED DRIVING MECHANISM

[75] Inventor: Yuji Yasuda, Tokyo, Japan
[73] Assignee: Ricoh Company, Ltd., Tokyo, Japan
[21] Appl. No.: 903,094
[22] Filed: Jun. 23, 1992
[30] Foreign Application Priority Data Jun. 25, 1991 [JP] Japan .................. 3-153521

[51] Int. Cl.$^5$ ............................................. B41J 2/435
[52] U.S. Cl. .................................................. 346/108
[58] Field of Search ............. 346/108, 1.1, 107 R, 346/76 L, 160; 388/296, 300, 302

[56] References Cited

U.S. PATENT DOCUMENTS

| 4,809,021 | 2/1989 | Check et al. ............. 346/108 |
| 4,856,858 | 8/1989 | Koika et al. ............. 359/213 |
| 4,972,208 | 11/1990 | Young et al. . |
| 5,210,583 | 5/1993 | Monma ............. 355/309 |

FOREIGN PATENT DOCUMENTS

| 2213998 | 8/1972 | Fed. Rep. of Germany . |
| 3721914 | 2/1988 | Fed. Rep. of Germany . |
| 1257980 | 10/1989 | Japan . |
| 2156260 | 6/1990 | Japan . |

OTHER PUBLICATIONS

Patent Abstracts of Japan, vol. 14, No. 442 (P-1109), JP 2-173767, Jul. 5, 1990, Toshihiko Nakazawa, "Color Image Processor".

*Primary Examiner*—Mark J. Reinhart
*Attorney, Agent, or Firm*—Oblon, Spivak, McClelland, Maier & Neustadt

[57] ABSTRACT

An optical image writing unit includes a photoconductive body, a writing device for optically writing images periodically on the photoconductive body at a writing interval $t_0$, and a driving mechanism, operatively coupled to the writing means, for moving the photoconductive body so that the images are periodically written by the writing device at a predetermined area on the photoconductive body. The driving mechanism includes a driving motor, and a driving pulley rotated by the driving motor so that the photoconductive body is moved by rotation of the driving pulley, wherein the driving mechanism is formed so that a time in which the driving pulley makes one revolution is approximately one n-th of the writing interval $t_0$, n being an integer.

11 Claims, 10 Drawing Sheets

| SPEED VARIATION ALLOWABLE ERROR | 10 % | 5 % |
|---|---|---|
| 0.2 mm | 2.32 ~ 2.68 Hz (-7.2 ~ 7.2 %) | 2.2 ~ 2.9 Hz (-12 ~ 16 %) |
| 0.15 mm | 2.36 ~ 2.63 Hz (-5.6 ~ 5.2 %) | 2.26 ~ 2.77 Hz (-9.6 ~ 10.8 %) |
| 0.1 mm | 2.4 ~ 2.6 Hz (-4 ~ 4 %) | 2.32 ~ 2.68 Hz (-7.2 ~ 7.2 %) |

( ) : ERROR WITH RESPECT TO fo (=2.5Hz)

OPTICAL IMAGE WRITING UNIT HAVING IMPROVED DRIVING MECHANISM

BACKGROUND OF THE INVENTION (1) Field of the invention

The present invention generally relates to an optical image writing unit, and more particularly to an optical image writing unit applicable to a xerographic image forming apparatus.

(2) Description of related art

An image writing unit provided in a xerographic image forming apparatus for forming multicolor images is provided with one or a plurality of light beams used for optically writing images. The light beams are modulated in accordance with image data, and scan the surface of a photoconductive body (i.e. a photoconductive drum, or a photoconductive belt) moved at a predetermined speed, so that electrostatic latent images are formed on the photoconductive body. The electrostatic latent images are developed so as to be visualized in colors, and a multicolor image is obtained by superposing developed color images. In this type of image writing unit, an optical writing position on the photoconductive body, to which position each light beam is projected, varies from an original optical writing position to which the light beam should be projected, due to a variation of the moving speed of the photoconductive body. As a result of this, colors are offset in the multicolor image, and thus the quality of the multicolor image deteriorates.

In a case where a ladder chart having black and red lines alternately arranged at a constant pitch is recorded under a condition in which there is no variation of the moving speed of the photoconductive body, the black lines BK and the red lines RD are arranged at the constant pitch in a recorded image, as shown in FIG. 1. On the other hand, in a case where there is a variation of the moving speed of the photoconductive body, a distance between black and white lines GK and RD adjacent to each other varies in the recorded image corresponding to the ladder chart, as shown in FIG. 2.

The variation of the moving speed of the photoconductive body is mainly caused by eccentricities of the photoconductive drum, driving rollers for driving the photoconductive belt, and pulleys and gears provided in a driving mechanism of the photoconductive body. In a case where there are eccentricities of the pulleys, the gears and the like, the moving speed of the photosensitive body periodically varies. When the moving speed of the photoconductive body periodically varies, an amount of displacement between the actual optical writing position and the original optical writing position periodically varies also. This displacement is referred to as a writing position displacement $\Delta x$.

The following optical image writing units have been conventionally proposed to eliminate the above problem caused by the variation of the moving speed of the photoconductive drum.

A first conventional optical image writing unit is disclosed in Japanese Patent Laid Open Publication No.1-257980. The first conventional optical image writing unit has two light beams used for optically writing images. In the first conventional optical image writing unit, a variation cycle of moving speed (position) of the photosensitive body is measured, and a distance between optical writing positions, on the photoconductive drum, to which positions two light beams are respectively projected is determined based on the measured variation cycle of the moving speed of the photosensitive drum.

A second conventional optical image writing unit is disclosed in Japanese Laid Open Publication No.2-156260. In the second conventional optical image writing unit, image forming units are arranged around a transfer drum at positions corresponding to the same phase in a variation cycle of the moving speed of the transfer drum.

However, regarding the first conventional optical image writing unit, to determine the distance between optical writing positions of two light beams on the photosensitive drum, an experimental unit having the same layout as an actual unit must be made. In the experimental unit, the variation cycle of the moving speed has to be measured. Thus, a large amount of time is required to design the optical image writing unit. In addition, the distance between two optical writing positions on the photosensitive drum also depends on a layout of other units, such as developing units. In a case where the distance between two optical writing positions is determined based on only the variation cycle of the moving speed of the photoconductive body, the developing units are not always efficiently arranged around the photoconductive body. Thus, there is a case where the size of the optical image writing unit increases.

In the second conventional optical image writing unit, the disadvantages caused by the variation of the moving speed of the transfer drum are eliminated. In this case, if there is no variation of a moving speed of a photoconductive body in each of the image forming units arranged around the transfer drum, color images formed by the image forming units can be accurately superposed on each other on the transfer drum. However, there is variation of the moving speed of the photoconductive body in each image forming unit. Thus, colors in the multicolor image are offset by the variation of the moving speed of the photoconductive body in each image forming unit.

SUMMARY OF THE INVENTION

Accordingly, a general object of the present invention is to provide a novel and useful optical image writing unit in which the disadvantages of the aforementioned prior art are eliminated.

A more specific object of the present invention is to provide an optical image writing unit in which the quality of an image is prevented from being deteriorated by the variation of moving speed of a photoconductive body without a layout of units to be arranged around the photoconductive body being affected.

The above objects of the present invention are achieved by an optical image writing unit comprising: a photoconductive image carrier medium; writing means for optically writing images periodically on the photoconductive image carrier medium at a writing interval $t_0$; and a driving mechanism, operatively coupled to the writing means, for moving the photoconductive image carrier medium so that the images are periodically written by the writing means at a predetermined area on the photoconductive image carrier medium, the driving mechanism comprising: a drive source; and a driving element rotated by the drive source so that the photoconductive image carrier medium is moved by rotation of the driving element, wherein the driving mechanism is formed so that a time for which the driving element makes one revolution is approximately one n-th of the writing interval $t_0$, n being an integer.

According to the present invention, as the driving mechanism is formed so that a time for which the driving element makes one revolution is approximately one n-th of the writing interval $t_0$, the plurality of the image formed on the photoconductive body are accurately stacked on each other. Thus, the quality of an image formed of stacked images can be prevented from being deteriorated by the variation of moving speed of a photoconductive body, without a layout of units to be arranged around the photoconductive body being affected.

Additional objects, features and advantages of the present invention will become apparent from the following detailed description when read in conjunction with the accompanying drawings.

DESCRIPTION OF PREFERRED EMBODIMENTS

The variation of the moving speed of the photoconductive body is mainly caused by eccentricities of driving parts such as pulleys and gears in a driving mechanism, as has been described above. In a case where each of the driving parts such as the pulleys and the gears are manufactured, the amount of the eccentricity of each of the driving parts has no relation to size (an outside diameter) thereof. That is, the amount of eccentricity of each of the driving parts is approximately constant no matter what the outside diameter thereof is. Thus, the smaller the outside diameter of the driving part, the greater the eccentricity affects the driving part.

In a general driving mechanism, to decrease the power of a motor and the degree of effect of a load variation at a follower side of a driving mechanism, a speed reducer is used in a driving mechanism. In this case, a pulley or a gear mounted on the motor (a driving source) is small. Thus, in the optical image writing unit, an eccentricity of a pulley, a gear or a roller close to the motor strongly affects the moving speed of the photoconductive body. In the following embodiments, the variation of the moving speed of the photoconductive drum and belt caused by an eccentricity of a pulley mounted on a motor for driving the photoconductive drum, and an eccentricity of a driving roller of the photoconductive belt will be considered.

A description will now be given, with reference to FIGS. 3 through 7, of a first embodiment of the present invention.

Figure 3:
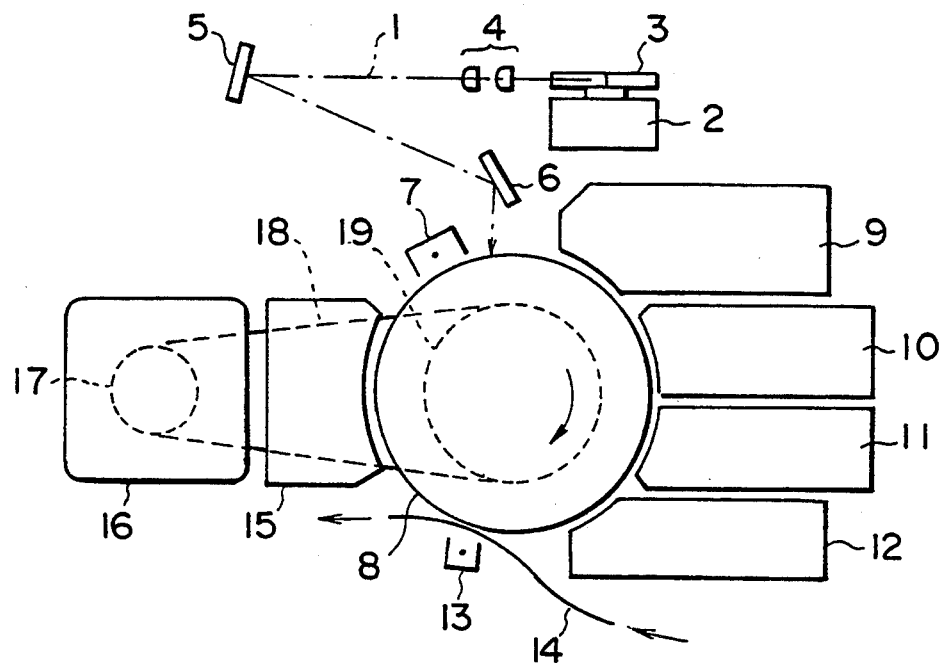
FIGS. 3 and 4 are diagrams illustrating optical image writing units according to a first embodiment of the present invention.

FIG. 3 shows an example of a structure of an optical image writing unit.

Referring to FIG. 3, a laser beam 1 emitted from a laser unit is reflected by polygonal mirror 3 rotated by a motor 2. The laser beam 1 reflected by the polygonal mirror 3 is projected onto a photoconductive drum 8 via an f-θ lens 4, a first mirror 5 and a second mirror 6. When the polygonal mirror 3 is rotated by the motor 2, the laser beam scans the photoconductive drum 8 in a direction parallel to an axis of the photoconductive drum 8. A charger unit 7, a first developing unit 9, a second developing unit 10, a third developing unit 11, a fourth developing unit 12, a transfer unit 13, and a cleaning unit 15 are arranged around the photoconductive drum 8. An optical writing position to which the laser beam 1 is projected on the photoconductive drum 8 is set between the charger unit 7 and the first developing unit 9. A drum pulley 19 is mounted on a shaft of the photoconductive drum 8. A driving pulley 17 is mounted on a shaft of a driving motor 16. The driving pulley 17 and the drum pulley 19 are coupled to each other by a belt 18 so that the photoconductive drum 8 is rotated by the driving motor 16. The outside diameter of the driving pulley 17 is less than that of the drum pulley 19. Thus, the driving pulley 17, the belt 18 and the drum pulley 19 form a speed reducing mechanism. In this case, the variation of the moving speed of the driving pulley 17 strongly affects a position at which a latent image is formed on the photoconductive drum 8.

While the photoconductive drum 8 is being rotated by the driving motor 16, a xerographic process is carried out on the photoconductive drum 8. That is, the laser beam modulated in accordance with first image data scans the photoconductive drum 8 which is uniformly charged by the charger unit 7, so that a first electrostatic latent image corresponding to the first image data is formed on the photoconductive drum 8. The first electrostatic latent image is developed by the first developing unit, so that a first toner color image corresponding to the first electrostatic latent image is formed on the photoconductive drum 8. The photoconductive drum 8 is then rotated further, and an image forming area on which the first toner color image is formed is uniformly charged by the charger unit 7. Then, the laser beam modulated in accordance with second image data scans the image forming area thereof on the photoconductive drum 8, so that a second electrostatic latent image corresponding to the second image data is formed on the image forming area. The second electrostatic latent image is developed by the second developing unit 10. As a result, a second toner color image corresponding to the second electrostatic latent image is formed on the image forming area so as to be stacked on the first toner color image.

After this, a third toner color image and a fourth toner color image are formed on the image forming area by using the third and fourth developing units 11 and 12 in the same manner as the first and second toner color images. That is, the first, second, third and fourth toner color images are stacked on each other so that a multicolor image is formed on the photoconductive drum 8. The multicolor image is then transferred from the photoconductive drum 8 to a recording sheet 14 by the transfer unit 13, and then the multicolor image is fused and fixed on the recording sheet 14 by a fixing unit (not shown). Toner remaining on the photoconductive drum 8 after the multicolor image is transferred is then removed from the photoconductive drum 8 by the cleaning unit 15.

Figure 4:
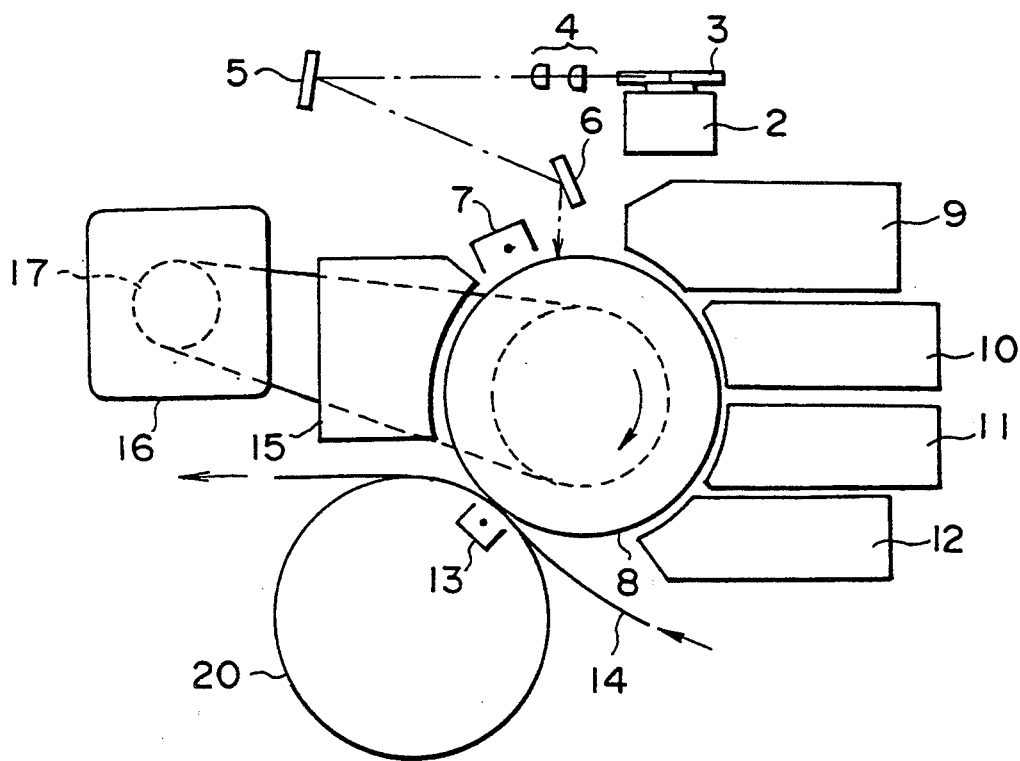

FIG. 4 shows another example of a structure of an optical image writing unit. In FIG. 4, those parts which are the same as those shown in FIG. 3 are given the same reference numbers.

Referring to FIG. 4, a transfer drum 20 is provided so as to be in contact with the photoconductive drum 8. The transfer unit 13 is mounted at a position near the photoconductive drum 8 in the transfer drum 20. In this optical image writing unit, the first toner color image is formed on the photoconductive drum 8 by using the first developing unit 9 in the same manner as that described in the above case, and then the first toner color image is transferred from the photoconductive drum 8 to the recording sheet 14 held on the transfer drum 20 by the transfer unit 13. After this, the second toner color image, the third toner color image and the fourth toner color image are successively formed on the photoconductive drum 8 and transferred to the recording sheet 14 held on the transfer drum 20. As a result, a multicolor image in which the first, second, third and fourth toner color images are superposed is formed on the recording sheet 14. Then the recording sheet 14 is separated from the transfer drum 20, and the multicolor image is fused and fixed on the recording sheet 14 by the fixing unit (not shown).

Figure 5:
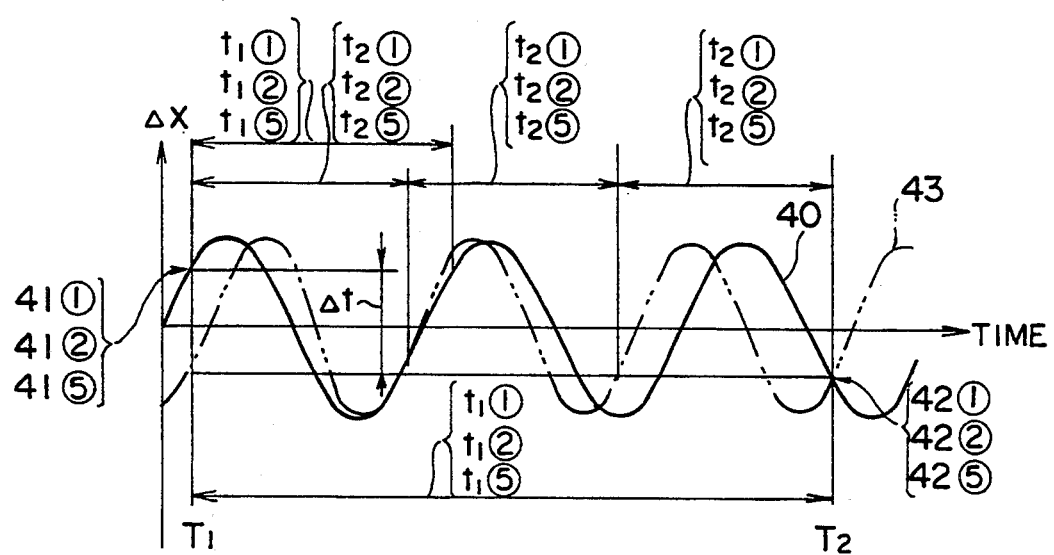
FIG. 5 is a graph illustrating writing position displacements.

In a case where the moving speed (a peripheral speed) of the driving pulley 17 periodically varies due to the eccentricity thereof, the moving speed of the photoconductive drum 8 also periodically varies. In this case, the writing position displacement $\Delta x$ on the photoconductive drum 8 varies, as shown in FIG. 5, at the same cycle as the moving speed of the photoconductive drum 8. The writing position displacement $\Delta x$ varies in the same period as the moving speed of the photoconductive drum 8.

Referring to FIG. 5, when the driving pulley 17 makes one revolution in a time $t_1$ ①, the writing position displacement $\Delta x$ on the photoconductive drum 8 periodically varies in a cycle $t_1$ ①, as indicated by a solid line 40. A period between a first time $T_1$ at which the laser beam 1 starts to scan and a second time $T_2$ at which the laser beam 1 starts to scan again is defined as $t_0$ ①. The period between the above first and second times $T_1$ and $T_2$ is referred to as an exposure interval. The exposure interval $t_0$ ① is equal to a time in which the photoconductive drum 8 makes one revolution. In a case where the writing position displacement $\Delta x$ periodically varies as shown by the solid line 40, the writing position displacement $\Delta x$ has a displacement value 41 ① at the first time $T_1$, and a displacement value 42 ① at the second time $T_2$. A difference between the displacement values 41 ① and 42 ① is referred to as a position error $\Delta L$ ①. The larger the position error $\Delta L$ ①, the larger the difference between positions where the electrostatic latent images are formed at the first and second times $T_1$ and $T_2$. That is, colors are largely offset in the multicolor image formed by the optical image writing unit.

The time in which the driving pulley 17 makes one revolution is set to a time $t_2$ ① which is one n-th of the exposure interval $t_0$ ①, where n is an integer. In this case, the writing position displacement $\Delta x$ periodically varies as shown by a chain double-dashed line 43 in FIG. 5. In the writing position displacement $\Delta x$ shown by the chain double-dashed line 43, displacement values at the first and second times $T_1$ and $T_2$ at which the electrostatic latent images are formed are equal to each other. That is, the position error $\Delta L$ is zero, so that the electrostatic latent images are formed at the same position on the photoconductive drum 8.

When the photoconductive drum 8 is driven under the following condition, the position error $\Delta L$ becomes zero.

The exposure interval $t_0$ ① and the time $t_2$ ① in which the driving pulley 17 makes one revolution are expressed by the following formulas (1) and (2):

$$t_0① = 1/\gamma_1 ① [\text{sec.}] \tag{1}$$

$$t_2① = 1/\gamma_2 ① [\text{sec.}] \tag{2}$$

where $\gamma_1$ ① [rps] is revolutions per unit time (second) of the photoconductive drum 8 (the drum pulley 19), and $\gamma_2$ ① [rps] is revolutions per unit time (second) of the driving pulley 17. Further, the relationship expressed by the following formula (3) is satisfied;

$$t_0① = n \cdot t_2① \tag{3}$$

where n is an integer. In accordance with the above formulas (1) through (3), a condition represented by the following formula (4) is obtained.

$$\gamma_2① = n \cdot \gamma_1① \tag{4}$$

When the photoconductive drum 8 is driven under the condition represented by the formula (4), the position error $\Delta L$ becomes zero. That is, when the revolution per unit time of the driving pulley 17 is n times the revolution per unit time of the photoconductive drum 8, the position error $\Delta L$ becomes zero. The outside diameter of the driving pulley 17 and that of the drum pulley 19 are then set to values so that the above formula (4) is satisfied.

A driving mechanism having the driving pulley 17 and the drum pulley 19 is actually designed as described below.

When the moving speed v [mm/sec] of the photoconductive drum 8 periodically varies by A [%] at a frequency f, the variation Δv of the moving speed is represented by the following formula (5);

$$\Delta v = v/2 \cdot A/100 \cdot \sin(2\pi f t + C_1) \quad (5)$$

where $f=1/t_2①$ and $C_1$ is an integral constant. In this case, the writing position displacement Δx is represented by the following formula (6);

$$\Delta x = v/2 \cdot A/100 \cdot 1/2\pi f \cdot [-\cos(2\pi f t + C_1)] + C_2 \quad (6)$$

where $C_2$ is an integral constant. The integral constants $C_1$ and $C_2$ are set, as initial conditions, to appropriate values, and the formula (6) is changed to the following formula (7).

$$\Delta x(t) = (A \cdot v/400\pi f) \cdot \sin 2\pi f t \quad (7)$$

In a case where a distance between an optical writing position at the first time $T_1$ and an optical writing position at the second time $T_2$ is denoted by L, the exposure interval $t_0①$ is represented by the following formula (8).

$$t_0② = L/v \quad (8)$$

Figure 1:
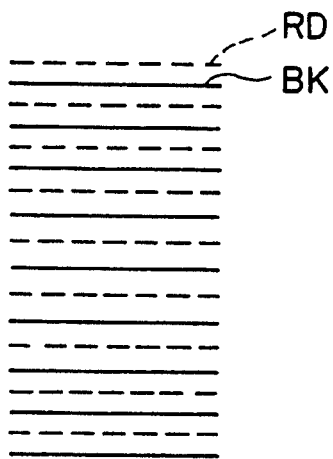
FIG. 1 is a diagram illustrating a printed image corresponding to a ladder chart obtained under a condition in which there is no variation of moving speed of a photoconductive body.
Figure 2:
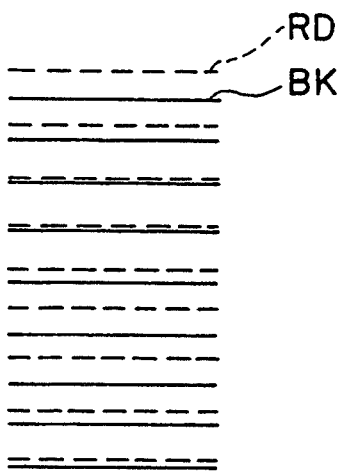
FIG. 2 is a diagram illustrating a printed image corresponding to a ladder chart obtained under a condition in which there is a variation of moving speed of photoconductive body.

In the optical image writing units shown in FIGS. 2 and 3, the distance L is equal to $\pi D$, where D is an outside diameter of the photoconductive drum 8.

The position error ΔL is defined by the following formula;

$$\Delta L = \Delta x(T_2) - \Delta x(T_1)$$

where $T_1$ and $T_2$ are times at which electrostatic latent images are formed, and $T_2 - T_1 = t_0①$. Here, as the writing position displacement Δx is represented by using a sine-function, when $T_2$ is equal to $(t_0①)/2$ and $T_1$ equal to $(-t_0①)/2$, the position error ΔL becomes a maximum (Max.ΔL). The maximum position error Max.ΔL is represented by the following formulas (9).

$$\text{Max} \cdot \Delta L = 2 \cdot A \cdot v/400\pi f \, |\sin(2\pi f \cdot t_0①/2)| \quad (9)$$
$$= A \cdot v/200\pi f \, |\sin \pi f \cdot t_0①|$$

Thus, when $\sin \pi f \cdot t_0① = 0$, the position error ΔL is zero. That is, when $\pi f \cdot t_0① = n\pi$, the position error ΔL is zero.

$$\therefore f \cdot t_0① = n, \text{ or } t_0① = n \cdot t_2① \quad (10)$$

$$t_2① = 1/f$$

A relationship between $t_0①$ and $t_2①$ in the above formula (10) is indicated in FIG. 5.

Figure 6:
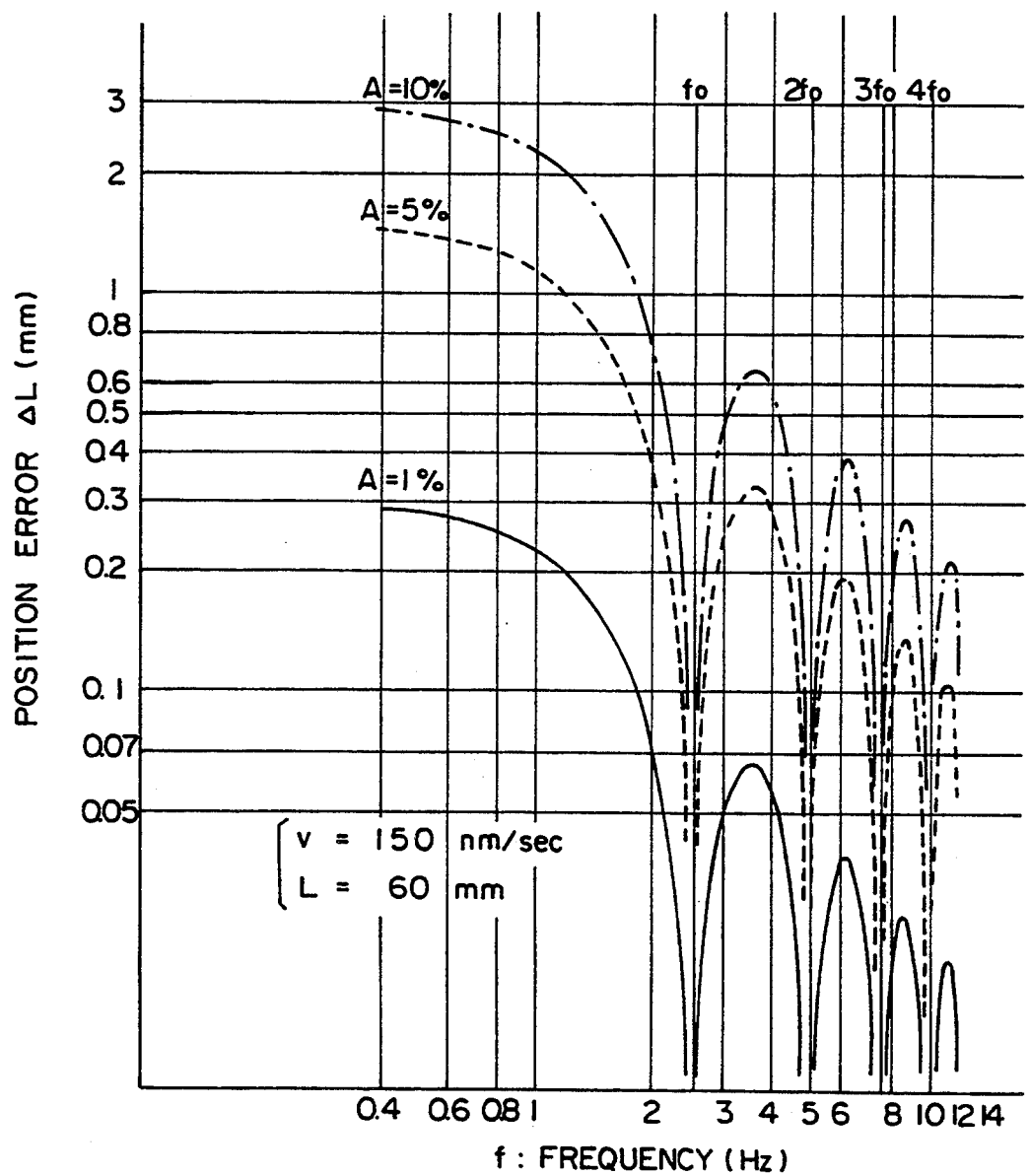
FIG. 6 is a graph illustrating relationships between frequencies of a variation of a moving speed of a photoconductive body and a position error $\Delta L$.

Under conditions, for example, in which $v = 150$ [mm/sec], $L = 60$ [mm], and a coefficient A of variation of the moving speed of the photoconductive drum 8 is set to 1%, 5%, and 10%, respectively, the maximum position error Max.ΔL calculated at respective frequencies is indicated in FIG. 6. The coefficient A of the variation of the moving speed of the photoconductive drum is referred to as a speed variation coefficient A. Referring to FIG. 6, when the moving speed of the photoconductive drum 8 periodically varies by 1% (A=1%), the maximum position error Max.ΔL varies in accordance with the frequencies as shown by a solid line. In a case where the speed variation coefficient A is equal to 5% (A=5%), the maximum position error Max.ΔL varies in accordance with the frequencies as shown by a dashed line, and in a case where the coefficient of the variation of the moving speed of the photoconductive drum 8 is equal to 10%, the maximum position error Max.ΔL varies in accordance with the frequencies as shown by a chain line in FIG. 6. The frequency $f_0$ represents a state where the time $t_2①$ in which the pulley 17 makes one revolution is equal to the exposure interval $t_0①$. That is, the frequency $f_0$ is equal to $1/t_0①$ ($f_0 = 1/t_0①$). Thus, when the frequency of the variation of the moving speed of the photoconductive drum 8 is set to a value n times that of the frequency $f_0$ ($f_0$, $2f_0$, $3f_0$, ...), the maximum position error Max.ΔL is equal to zero.

An allowable error of the frequency will be described bellow.

Figures 7, 8:
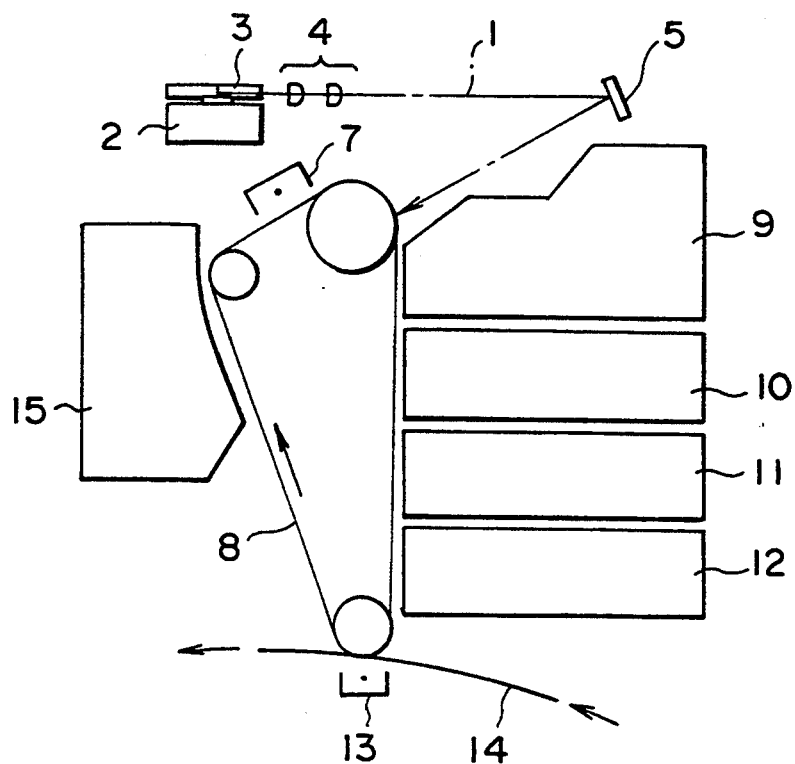
FIG. 7 is a table illustrating relationships between allowable errors and errors of frequencies.
FIG. 8 is a diagram illustrating an optical image writing unit according to a second embodiment of the present invention.

In a case where an allowable limits of the maximum position error Max.ΔL is less or equal to 0.2 mm, the allowable error of the frequency is indicated in a table shown in FIG. 7. The allowable error of the frequency indicated in the table was obtained with reference to the graph shown in FIG. 6. Referring to FIG. 7, to obtain the maximum position error Max.ΔL equal to or less than 0.15 mm, the allowable error of the frequency must be set to a value within a rage of ±5% under a condition where the speed variation coefficient A is equal to 10%. In addition, to obtain the same above maximum position error, under a condition where the speed variation coefficient A is equal to 5%, the allowable error of the frequency must be set to a value within a rage of ±10%.

The allowable error of the frequency corresponds to an allowable error of the revolution per unit time of the driving pulley 17. When the outside diameters of the driving pulley 17 and the drum pulley 19 are adjusted so that the revolution per unit time of the driving pulley 17 is n times the revolution per unit time of the photoconductive drum 8, an error of the number n (the ratio) is set, for example, to a value within a range of ±10%. In this case, the position error can be equal to or less than 0.15 mm under a condition where the speed variation coefficient is in a range of ±5%.

A description will now be given, with reference to FIGS. 5, 8 and 9, of a second embodiment of the present invention.

FIG. 8 shows an optical image writing unit according to the second embodiment. In FIG. 8, those parts which have the same functions as those shown in FIGS. 3 and 4 are given the same reference numbers.

Referring to FIG. 8, a photoconductive belt 8 is rotated by rollers. A charger unit 7, developing units 9 through 12, a transfer unit 13 and a cleaning unit 15 are arranged around the photoconductive belt 8. A laser beam 1, modulated in accordance with image data, is projected at an optical writing position on the photoconductive belt 8 after traveling via a polygonal mirror 3 rotated by a motor 2, an f-θ lens 4 and a mirror 5. In the optical image writing unit shown in FIG. 8, multicolor images are formed on a recording sheet 14 in accordance with the xerographic process in the same manner as that shown in FIGS. 3 and 4.

Figure 9:
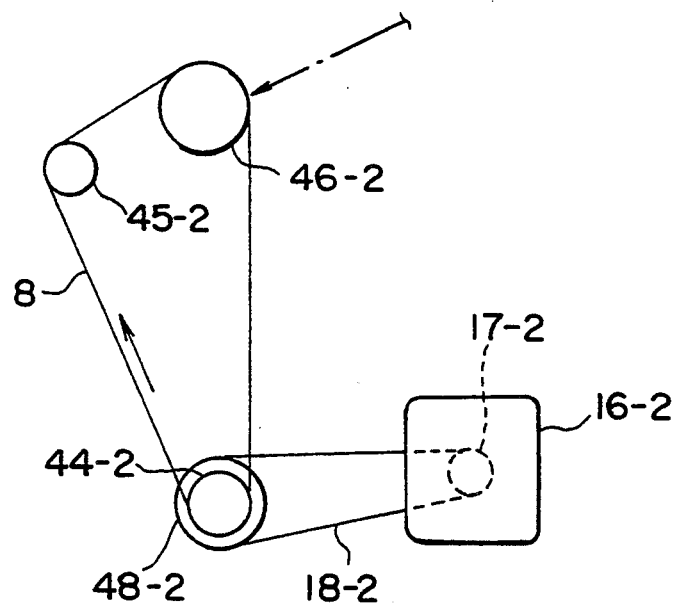
FIG. 9 is a diagram illustrating a driving mechanism for driving a photoconductive belt shown in FIG. 8.

FIG. 9 shows a driving mechanism for driving the photoconductive belt 8. Referring to FIG. 9, the photosensitive belt 8 is wound around a driving roller 44-1 and tension rollers 45-2 and 46-2, and spread by the tension rollers 45-2 and 46-2. A belt pulley 48-2 is mounted on a shaft of the driving roller 44-2 and coupled to a driving pulley 17-2 mounted on a shaft of a motor 16-2 by a driving belt 18-2. The photoconductive belt 8 is moved around the driving roller 44-2 and the tension rollers 45-2 and 46-2 by the motor 16-2.

In the above optical image writing unit, the moving speed of the photoconductive belt 8 varies as shown in FIG. 5. The cycle of the variation of the moving speed of the photoconductive belt 8 is equal to the cycle of the writing position displacement $\Delta x$ on the photoconductive belt 8. A variation of moving speed of a small roller caused by the eccentricity thereof strongly affects the moving speed of the photoconductive belt 8. Thus, the moving speed of the photoconductive belt 8 periodically varies due to the variation of the moving speed of the driving roller 44-2.

Referring to FIG. 5, when the driving roller 44-2 makes one revolution in a time $t_1$ ②, the writing position displacement $\Delta L$ periodically varies in a cycle $t_1$ ② as shown by the solid line 40. The exposure interval between the first time $T_1$ and the second time $T_2$ is denoted by $t_0$ ②. The exposure interval $t_0$ ② is equal to a time in which the photoconductive belt 8 makes one revolution. In a case where the writing position displacement $\Delta x$ periodically varies as shown by the solid line 40, the writing position displacement $\Delta x$ has a displacement value 41 ② at the first time $T_1$, and a displacement value 42 ② at the second time $T_2$. That is, the position error $\Delta L$ (the difference between the displacement values 41 ② and 42 ②) occurs.

The time in which the driving roller 44-2 makes one revolution is set to a time $t_2$ ② which is one n-th of the exposure interval $t_0$ ②, where n is an integer. In this case, the writing position displacement $\Delta x$ periodically varies as shown by the chain double-dashed line 43 in FIG. 5. In the writing position displacement $\Delta x$ shown by the chain double-dashed line 43, displacement values at the first and second times $T_1$ and $T_2$ at which the electrostatic latent images are formed are equal to each other. That is, the position error $\Delta L$ is zero, so that the electrostatic latent images are formed at the same position on the photoconductive belt 8.

When the photoconductive belt 8 is driven under the condition described later, the position error $\Delta L$ becomes zero.

The following formulas (11), (12) and (13) are satisfied;

$$t_0② = L_2/v [\text{sec}] \quad (11)$$

$$t_2② = \pi D/v [\text{sec}] \quad (12)$$

$$t_0② = n t_2② \quad (13)$$

where v [mm/sec] is a moving speed of the photoconductive belt 8, $L_2$ ② is a peripheral length of the photoconductive belt 8, and D is a diameter of the driving roller 44-2.

The formulas (11) and (12) are substituted for formulas (13), and thus the following formulas (14) and (15) are obtained.

$$L_2/v = n \cdot \pi D/v,$$

$$L_2 = n \cdot \pi \cdot D \quad (14)$$

$$D = L_2/n \cdot \pi \quad (15)$$

That is, the diameter D of the driving roller 44-2 is set so that the above formula (15) is obtained. As a result of this, the position error $\Delta L$ is equal to zero.

The allowable error of the integer n which is a ratio of the peripheral length between the first and second writing position to the diameter of the driving roller is set in the same manner as the allowable error of the integer n described above.

A description will now be given, with reference to FIGS. 10, 11 and 12, of a third embodiment of the present invention.

Figure 10:
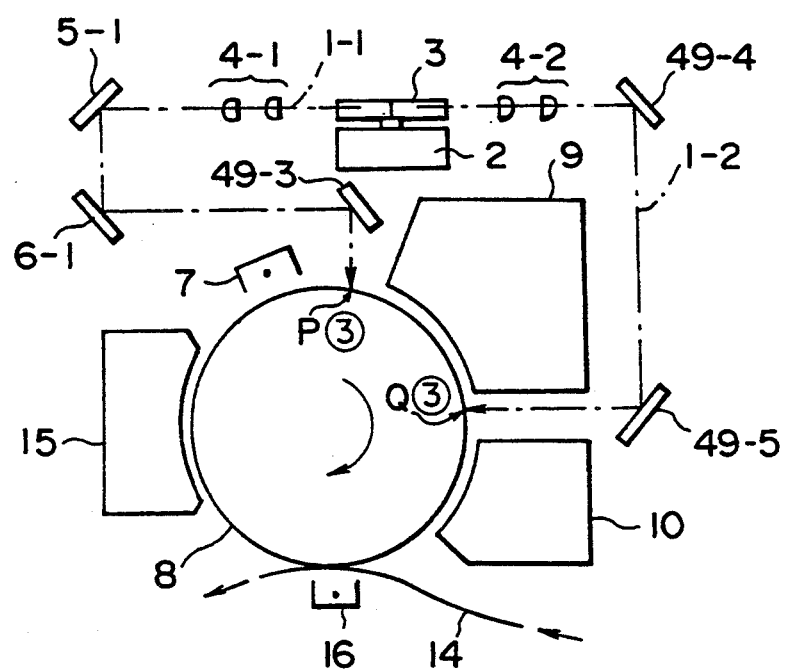
FIG. 10 is a diagram illustrating an optical image writing unit according to a third embodiment of the present invention.

FIG. 10 shows an optical image writing unit according to the third embodiment of the present invention. Referring to FIG. 10, a charger unit 7, a first developing unit 9, a second developing unit 10, a transfer unit 16 and a cleaning unit 15 are arranged around a photoconductive drum 8. A first laser beam 1-1, emitted from a first laser unit (not shown), is projected at a first writing position P ③ after traveling via a polygonal mirror rotated by a motor 2, an f-θ lens 4-1, and mirrors 5-1, 5-2 and 49-3. The first writing position P ③ is set on the photoconductive drum 8 between the charger unit 7 and the first developing unit 9. A second laser beam 1-2, emitted from a second laser unit (not shown), is projected to a second writing position Q ③ after traveling via the polygonal mirror, an f-θ lens 42-2 and mirrors 49-4 and 49-5. The second writing position Q ③ is set on the photoconductive drum 8 between the first and second developing units 9 and 10. When the polygonal mirror 3 is rotated at a predetermined speed by the motor 2, the first and second laser beams 1-1 and 1-2 respectively scan the photoconductive drum 8 at the first and second writing positions P ③ and Q ③.

A first electrostatic latent image formed on the photoconductive drum 8 by an exposure process of the first laser beam 1-1 is developed by the first developing unit 9, so that a first toner color image is formed on the photoconductive drum 8. A second electrostatic latent image formed on the photoconductive drum 8 by an exposure process of the second laser beam 1-2 is developed by the second developing unit 10, so that a second toner color image is formed on the photoconductive drum 8. The first and second toner color images are superposed, and transferred from the photoconductive drum 8 to the recording sheet 14 by the transfer unit 16. As a result, a multicolor image of first and second toner color images is formed on the recording sheet 14. After this, the multicolor image is fused and fixed on the recording sheet 14 by a fixing unit (not shown). The residual toner remaining on the photoconductive drum 8 after the transferring process is removed by the cleaning unit 15.

Figure 11:
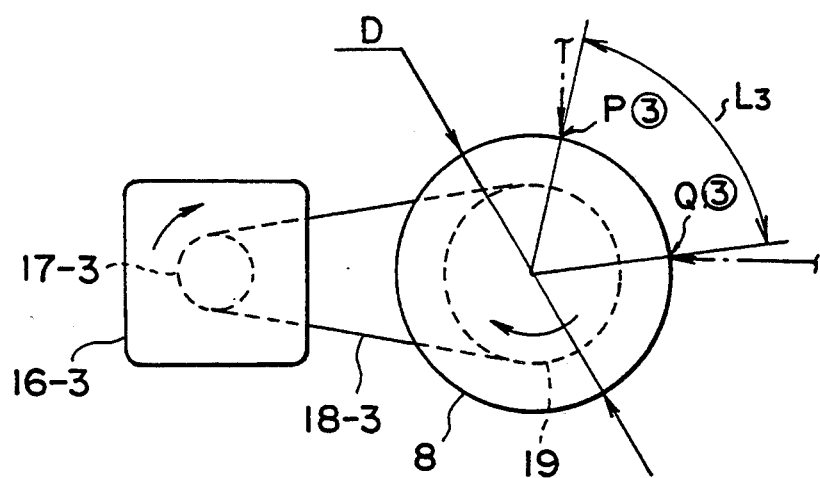
FIG. 11 is a diagram illustrating a driving mechanism for driving a photoconductive drum shown in FIG. 10.

FIG. 11 shows a driving mechanism for driving the photoconductive drum 8. Referring to FIG. 11, a driving pulley 17-3 mounted on a shaft of a driving motor 16-3 is coupled to the drum pulley 19 mounted on a shaft of the photoconductive drum 8 by a driving belt 18-3. The diameter of the driving pulley 17-3 is less than that of the drum pulley 19. Thus, the driving mechanism having the driving pulley 17-3 and the drum pulley 19 functions as a speed reducer.

As the diameter of the driving pulley 17-3 is small, the variation of the moving speed of the driving pulley 17-3 strongly affects the moving speed of the photoconductive drum 8. Thus, in a case where the moving speed (a peripheral speed) of the driving pulley 17-3 periodically varies due to the eccentricity thereof, the moving speed of the photoconductive drum 8 also periodically varies. In this case, the writing position displacement $\Delta x$ on the photoconductive drum 8 varies, as shown in FIG. 12, in the same cycle as the moving speed of the photoconductive drum 8. The writing position displacement $\Delta x$ varies in the same period as the moving speed of the photoconductive drum 8.

Figure 12:
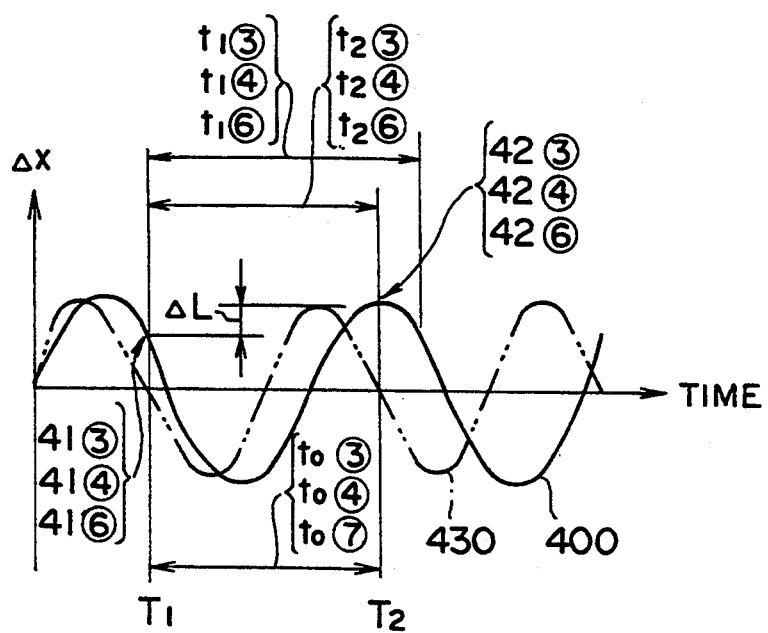
FIG. 12 is a graph illustrating writing position displacements.

Referring to FIG. 12, when the driving pulley 17-3 makes one revolution in a time $t_1$ ③, the writing position displacement $\Delta x$ on the photoconductive drum 8 periodically varies in a cycle $t_1$ ③, as indicated by a solid line 400. Here, a peripheral length on the photoconductive drum 8 between the first and second writing positions P ③ and Q ③ is denoted by $L_3$, and a time required for moving the photoconductive drum 8 the peripheral length $L_3$ is denoted by $t_0$ ③. That is, the exposure interval is denoted by $t_0$ ③. In a case where the writing position displacement $\Delta x$ periodically varies as shown by the solid line 400, the writing position displacement $\Delta x$ has a displacement value 41 ③ at the first time $T_1$, and a displacement value 42 ③ at the second time $T_2$. That is, the position error $\Delta L$ (the difference between the displacement values 41 ③ and 42 ③) occurs.

The time in which the driving pulley 17-3 makes one revolution is set to a time $t_2$ ③ which is one n-th of the exposure interval $t_0$ ③, where n is an integer. In this case, the writing position displacement $\Delta x$ periodically varies as shown by a chain double-dashed line 430 in FIG. 12. In the writing position displacement $\Delta x$ shown by the chain double-dashed line 430, displacement values at the first and second times $T_1$ and $T_2$ at which the electrostatic latent images are formed are equal to each other. That is, the position error $\Delta L$ is zero, so that the electrostatic latent images are formed at the same position on the photoconductive drum 8.

When the photoconductive drum 8 is driven under the condition described later, the position error $\Delta L$ becomes zero.

The following formulas (16), (17), (18) and (19) are satisfied;

$$v = \pi \cdot D \gamma_1 ③ \, [\text{mm/sec}] \quad (16)$$

$$t_0 ③ = L_3/v = L_3/\pi \cdot D \gamma_1 ③ \, [\text{sec}] \quad (17)$$

$$t_2 ③ = 1/\gamma_2 \, [\text{sec}] \quad (18)$$

$$t_0 ③ = n \cdot t_2 ③ \quad (19)$$

where $\gamma_1 ③$ [rps] is the revolution per unit time (sec) of the photoconductive drum 8, $\gamma_2 ③$ [rps] is the revolution per unit time (sec) of the driving pulley 17-3, v is the moving speed of the photoconductive drum 8, and D is a diameter of the photoconductive drum 8.

The formulas (17) and (18) are substituted for formulas (19), and thus the following formulas (20) and (21) are obtained.

$$L_3/\pi \cdot D \gamma_1 ③ = n/\gamma_2 ③ \quad (20)$$

$$\gamma_2 ③/\gamma_1 ③ = n \cdot \pi \cdot D/L_3 \quad (21)$$

That is, when the ratio of the revolution per unit time of the driving pulley 17-3 to the revolution per unit time of the photoconductive drum 8 is set to a value n times $\pi \cdot D/L_3$, the position error $\Delta L$ is equal to zero.

The allowable error of the integer n is set in the same manner as the error of the integer n described above.

A description will now be given, with reference to FIGS. 12, 13 and 14, of a fourth embodiment of the present invention.

Figure 13:
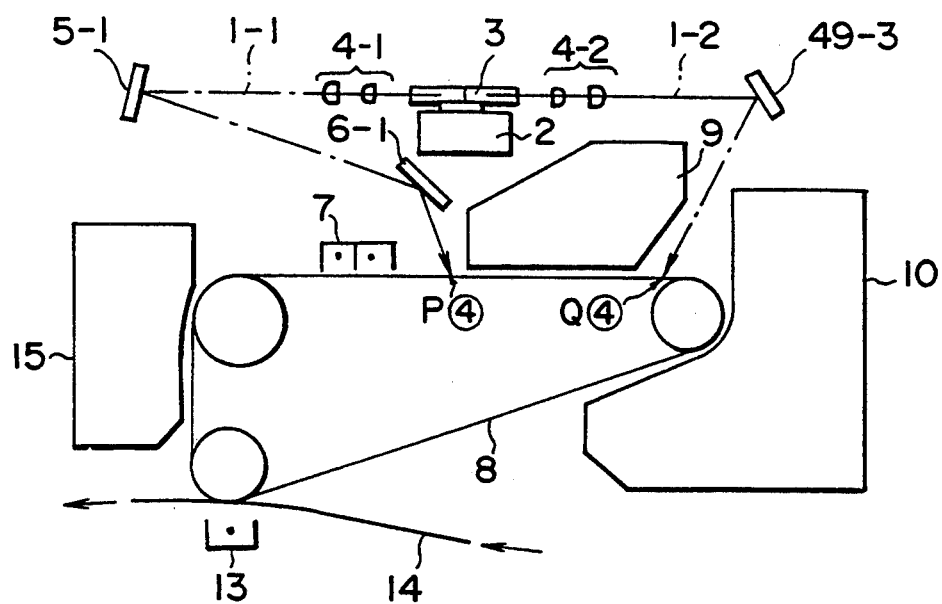
FIG. 13 is a diagram illustrating an optical image writing unit according to a fourth embodiment of the present invention.

FIG. 13 shows an optical image writing unit according to the fourth embodiment of the present invention. Referring to FIG. 13, a photoconductive belt 8 is moved around rollers. A charger unit 7, a first developing unit 9, a second developing unit 10, a transfer unit 13, and a cleaning unit 15 are arranged around the photoconductive belt 8. A first laser beam 1-1, emitted from a first laser unit (not shown), is projected at a first writing position P ④ on the photoconductive belt 8 after traveling via a polygonal mirror 3 rotated by a motor 2, an f-$\theta$ lens 4-1, and mirrors 5-1 and 6-1. A second laser beam 1-2, emitted from a second laser unit (not shown), is projected to a second writing position Q ④ on the photoconductive belt 8 after traveling via the polygonal mirror 3, an f-$\theta$ lens 4-2, and a mirror 49-3. When the polygonal mirror 3 is rotated at a predetermined speed by the motor 2, the first and second laser beams 1-1 and 1-2 respectively scan the photoconductive belt 8 at the first and second writing positions P ④ and Q ④.

A first electrostatic latent image formed on the photoconductive belt 8 by an exposure process of the first laser beam 1-1 is developed by the first developing unit 9, so that a first toner color image is formed on the photoconductive belt 8. A second electrostatic latent image formed on the photoconductive belt 8 by an exposure process of the second laser beam 1-2 is developed by the second developing unit 10, so that a second toner color image is formed on the photoconductive belt 8. The first and second toner color images are superposed, and transferred from the photoconductive belt 8 to the recording sheet 14 by the transfer unit 13. As a result, a multicolor image of first and second toner color images is formed on the recording sheet 14. After this, the multicolor image is fused and fixed on the recording sheet 14 by a fixing unit (not shown). The residual toner remaining on the photoconductive belt 8 after the transferring process is removed by the cleaning unit 15.

Figure 14:
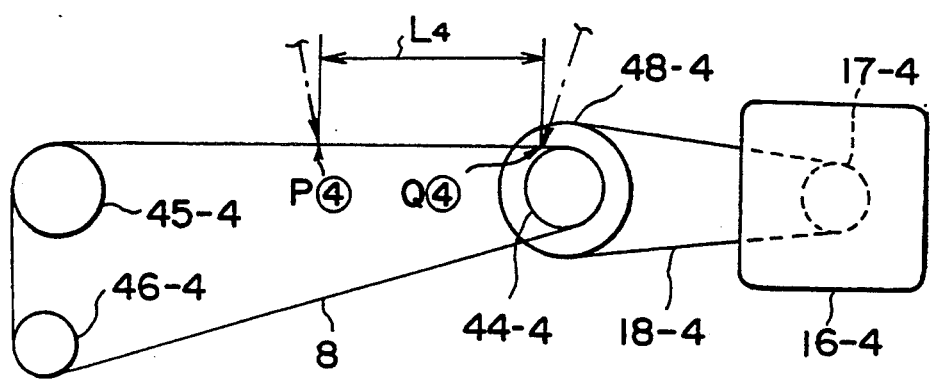
FIG. 14 is a diagram illustrating a driving mechanism for driving a photoconductive belt shown in FIG. 13.

FIG. 14 shows a driving mechanism for driving the photoconductive belt 8. Referring to FIG. 14, the photoconductive belt 8 is wound around a driving roller 44-4 and tension rollers 45-4 and 46-4, and spread by the tension rollers 45-4 and 46-4. A driving pulley 17-4 mounted on a shaft of a driving motor 16-4 is coupled to a belt pulley 48-4 mounted on a shaft of the driving roller 44-4 by a driving belt 18-4. The photoconductive belt 8 is moved around the driving roller 44-4 and the tension rollers 45-4 and 46-4 by the driving motor 16-4.

In the above optical image writing unit, the moving speed of the photoconductive belt 8 varies as shown in FIG. 12. The cycle of the variation of the moving speed of the photoconductive belt 8 is equal to the cycle of the writing position displacement $\Delta x$ on the photoconductive belt 8. A variation of moving speed of a small roller caused by the eccentricity thereof strongly affects the moving speed of the photoconductive belt 8. Thus, the moving speed of the photoconductive belt 8 periodically varies due to the variation of the moving speed of the driving roller 44-4.

Referring to FIG. 12, when the driving roller 44-4 makes one revolution in a time $t_1$ (4), the writing position displacement $\Delta x$ on the photoconductive belt 8 periodically varies in a cycle $t_1$ (4), as indicated by the solid line 400. Here, a peripheral length of the photoconductive belt 8 between the first and second writing position P (4) and Q (4) is denoted by $L_4$, and a time required for moving the photoconductive belt 8 the peripheral length $L_4$ is denoted by $t_0$ (4). That is, the exposure interval is denoted by $t_0$ (4). In a case where the writing position displacement $\Delta x$ periodically varies as shown by the solid line 400, the writing position displacement $\Delta x$ has a displacement value 41 (4) at the first time $T_1$, and a displacement value 42 (4) at the second time $T_2$. That is, the position error $\Delta L$ (the difference between the displacement values 41 (4) and 42 (4)) occurs.

The time in which the driving roller 44-4 makes one revolution is set to a time $t_2$ (4) which is one n-th of the exposure interval $t_0$ (4), where n is an integer. In this case, the writing position displacement $\Delta x$ periodically varies as shown by the chain double-dashed line 430 in FIG. 12. In the writing position displacement $\Delta x$ shown by the chain double-dashed line 430, displacement values at the first and second times $T_1$ and $T_2$ at which the electrostatic latent images are formed are equal to each other. That is, the position error $\Delta L$ is zero, so that the electrostatic latent images are formed at the same position on the photoconductive drum 8.

When the photoconductive belt 8 is driven under the following condition, the position error $\Delta L$ becomes zero.

The following formulas (22), (23) and (24) are satisfied;

$$t_0\text{e,crc}/4/ = L_4/v [\text{sec}] \tag{22}$$

$$t_2(4) = \pi \cdot D/v [\text{sec}] \tag{23}$$

$$t_0(4) = n \cdot t_2(4) \tag{24}$$

where v is the moving speed of the photoconductive belt 8, and D is the diameter of the driving roller 44-4.

The formulas (22) and (23) are substituted for formulas (24), and thus the following formulas (25) and (26) are obtained.

$$L_4/v = n \cdot \pi D/v,$$

$$L_4 = n \cdot \pi D \tag{25}$$

$$D = L_4/n \cdot \pi \tag{26}$$

That is, the diameter D of the driving roller 44-4 is set so that the above formula (26). As a result of this, the position error $\Delta L$ is equal to zero.

The allowable error of the integer n which is a ratio of the peripheral length $L_4$ between the first and second writing positions to the diameter D of the driving roller 44-4 is set in the same manner as the allowable error of the integer n described above.

A description will now be given, with reference to FIGS. 5, 15 AND 16, of a fifth embodiment of the present invention.

Figure 15:
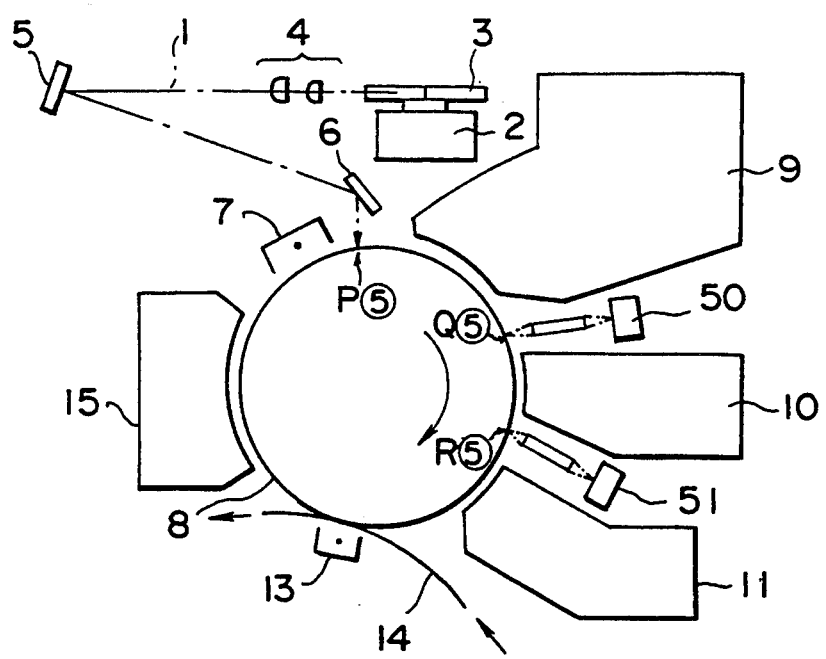
FIG. 15 is a diagram illustrating an optical image writing unit according to a fifth embodiment of the present invention.

FIG. 15 shows an optical image writing unit according to the fifth embodiment of the present invention. Referring to FIG. 15, the photoconductive drum 8 is rotated at a predetermined speed. A charger unit 7, a first developing unit 9, a second developing unit 10, a third developing unit 11, a transfer unit 13 and a cleaning unit 15 are arranged around the photoconductive drum 8. A first laser beam 1, emitted from a laser unit (not shown) is projected to a first writing position P (5) on the photoconductive drum 8 after traveling via a polygonal mirror 3 rotated by a motor 2, an f-$\theta$ lens 4 and reflecting mirrors 5 and 6. The first writing position P (5) is set on the photosensitive drum 8 between the charger unit 7 and the first developing unit 9. A first electrostatic latent image formed on the photoconductive drum 8 by an exposure process of the laser beam 1 is developed by the first developing unit 9, so that a first toner color image is formed on the photoconductive drum 8. The laser unit, the polygonal mirror 3, the f-$\theta$ lens 4 and the reflecting mirrors 5 and 6 form a first exposure unit.

A second exposure unit 50 is provided between the first and second developing units 9 and 10. The second exposure unit 50 has an LED array. A light pattern, corresponding to image data, output from the LED array is projected to a second writing position Q (5) on the photoconductive drum 8. That is, the second writing position Q (5) is set between the first and second developing units 9 and 10. A second electrostatic latent image formed by an exposure process of the second exposure unit 50 is developed by the second developing unit 10, so that a second toner color image is formed on the photoconductive drum 8.

A third exposure unit 51 is provided between the second and third developing units 10 and 11. The third exposure unit 51 has the same structure as the second exposure unit 50. A light pattern, corresponding to image data, output from an LED array of the third exposure unit 51 is projected to a third writing position R (5) on the photoconductive drum 8. That is, the third writing position R (5) is set between the second and third developing units 10 and 11. The third electrostatic latent image formed on the photoconductive drum 8 by an exposure process of the third exposure unit 51 is developed by the third developing unit 11, so that a third toner color image is formed on the photoconductive drum 8.

The first, second and third toner color images are superposed and transferred from the photoconductive drum 8 to the recording sheet 14 supplied from a sheet supply unit (not shown) by the transfer unit 13. As a result, a multicolor image of the first, second and third toner color images is formed on the recording sheet 14. After this, the multicolor image is fused and fixed on the recording sheet by a fixing unit (not shown). Residual toner remaining on the photoconductive drum 8 is removed by the cleaning unit 15.

In the fifth embodiment, the first developing unit 9 stores a black toner so that a black toner image is formed, the second developing unit 10 stores a red toner so that a red toner image is formed, and the third developing unit 11 stores a blue toner so that a blue toner image is formed. In general, a large amount of black toner is used for forming an image. Thus, the size of the first developing unit 9 is larger than those of the second and third developing units 10 and 11. As a result, a first peripheral length $L_5$-1 on the photoconductive drum 8 between the first and second writing positions P (5) and Q (5) is greater than a second peripheral length $L_5$-2 on the photoconductive drum 8 between the second writing position Q (5) and the third writing position R (5).

Figure 16:
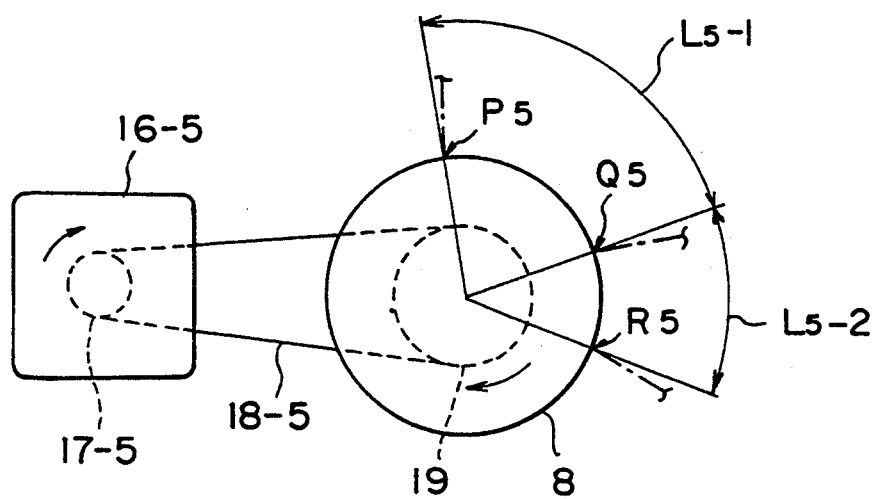
FIG. 16 is a diagram illustrating a driving mechanism for driving a photoconductive drum shown in FIG. 15.

FIG. 16 shows a driving mechanism for driving the photoconductive drum 8. Referring to FIG. 16, a driving pulley 17-5 mounted on a shaft of a driving motor 16-5 is coupled to the drum pulley 19 mounted on a shaft of the photoconductive drum 8 by a driving belt 18-5. The diameter of the driving pulley 17-5 is less than the diameter of the drum pulley 19, so that the driving mechanism having the driving pulley 17-5 and the drum pulley 19 functions as a speed reducer. The first and second peripheral lengths $L_5$-1 and $L_5$-2 are respectively set as follows;

$$L_5\text{-}1 = i \cdot L_o$$

$$L_5\text{-}2 = j \cdot L_o$$

where i and j are integers each in a range of 1-4, $L_o$ is a predetermined length referred to as a greatest common divisor length. In the optical image writing unit shown in FIGS. 15 and 16, i and j are respectively set to 2 and 1. Thus, the first peripheral length $L_5$-1 is twice as large as the second peripheral length $L_5$-2.

As the diameter of the driving pulley 17-5 is small, the variation of the moving speed of the driving pulley 17-5 strongly affects the moving speed of the photoconductive drum 8. Thus, in a case where the moving speed (a peripheral speed) of the driving pulley 17-5 periodically varies due to the eccentricity thereof, the moving speed of the photoconductive drum 8 also periodically varies. In this case, the writing position displacement $\Delta x$ on the photoconductive drum 8 varies, as shown in FIG. 5, in the same cycle as the moving speed of the photoconductive drum 8. The writing position displacement $\Delta x$ varies in the same period as the moving speed of the photoconductive drum 8.

Referring to FIG. 5, when the driving pulley 17-5 makes one revolution in a time $t_1$ ⑤, the writing position displacement $\Delta x$ on the photoconductive drum 8 periodically varies in a cycle $t_1$ ⑤, as indicated by the solid line 40. Here, a time in which the photoconductive drum 8 is moved the greatest common divisor length $L_0$ is denoted by $t_0$ ⑤. In a case where the writing position displacement $\Delta x$ periodically varies as shown by the solid line 40, the writing position displacement $\Delta x$ has a displacement value 41 ⑤ at a first time $T_1$, and a displacement value 42 ⑤ at a second time $T_2$ after n $t_0$ ⑤ (n=1) from the first time $T_1$ has elapsed. That is, the position error $\Delta L$ (the difference between the displacement values 41 ⑤ and 42 ⑤) occurs.

The time in which the driving pulley 17-5 makes one revolution is set to a time $t_2$ ⑤ which is one n-th of the time $t_0$ ⑤ corresponding to the greatest common divisor length $L_o$, where n is an integer. In this case, the writing position displacement $\Delta x$ periodically varies as shown by the chain double-dashed line 43 in FIG. 5. In the writing position displacement $\Delta x$ shown by the chain double-dashed line 43, displacement values at the first and second times $T_1$ and $T_2$ at which the electrostatic latent images are formed are equal to each other. That is, the position error $\Delta L$ is zero, so that the electrostatic latent images are formed at the same position on the photoconductive drum 8.

When the photoconductive drum 8 is driven under the condition described later, the position error $\Delta L$ becomes zero.

The following formulas (27), (28) and (29) are satisfied;

$$v = \pi \cdot D \cdot \gamma_1 ⑤ \text{[mm/sec]} \tag{27}$$

$$t_0 ⑤ = L_o/v = L_o/\pi \cdot D \gamma_1 ⑤ \text{[sec]} \tag{28}$$

$$t_2 ⑤ = 1/\gamma_2 ⑤ \text{[sec]} \tag{29}$$

$$t_0 ⑤ = n \cdot t_2 ⑤ \tag{30}$$

where $\gamma_1$ ⑤ [rps] is the revolution per unit time (sec) of the photoconductive drum 8, $\gamma_2$ ⑤ [rps] is the revolution per unit time (sec) of the driving pulley 17-5, v is the moving speed of the photoconductive drum 8, and D is a diameter of the photoconductive drum 8.

The formulas (28) and (29) are substituted for formulas (30), and thus the following formulas (31) and (32) are obtained.

$$L_0/\pi \cdot D \gamma_1 ⑤ = n/\gamma_2 ⑤ \tag{31}$$

$$\gamma_2 ⑤/\gamma_1 ⑤ = n \cdot \pi \cdot D/L_o \tag{32}$$

That is, when the ratio of the revolution per unit time of the driving pulley 17-4 to the revolution per unit time of the photoconductive drum 8 is set to a value n times $\pi \cdot D/L_o$, the position error $\Delta L$ is equal to zero.

The allowable error of the integer n is set in the same manner as the error of the integer n described above.

A description will now be given, with reference to FIGS. 12, 17 and 18, of a sixth embodiment of the present invention.

Figure 17:
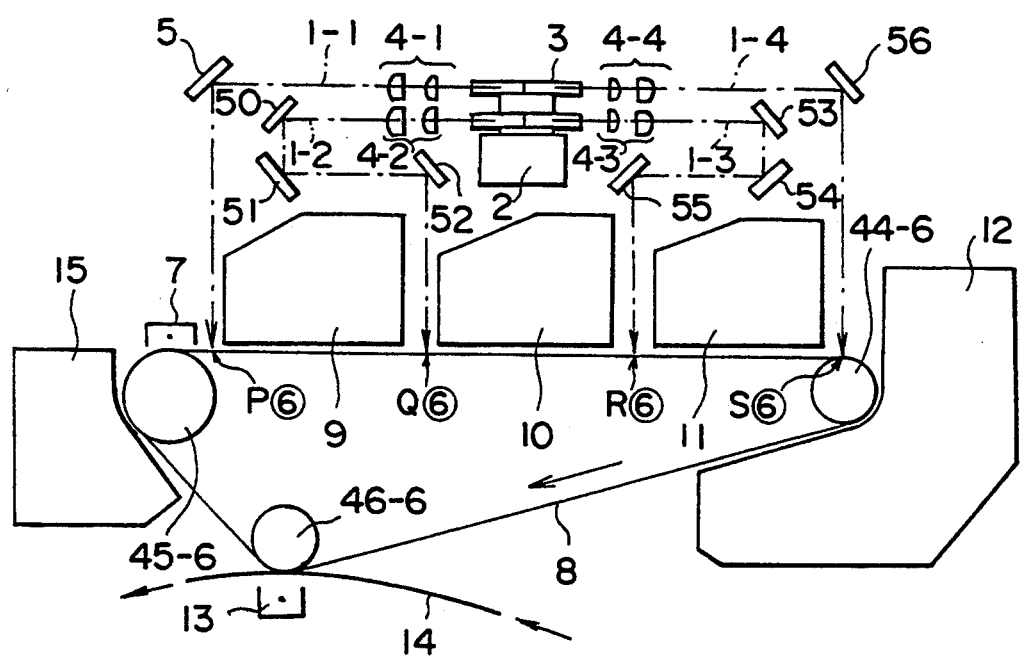
FIG. 17 is a diagram illustrating an optical image writing unit according to a sixth embodiment of the present invention.

FIG. 17 shows an optical image writing unit according to the sixth embodiment of the present invention. Referring to FIG. 17, the photoconductive belt 8 is wound around a driving roller 44-6 and tension rollers 45-6 and 46-6. A charger unit 7, a first developing unit 9, a second developing unit 10, and a third developing unit 11 are arranged between the driving roller 44-6 and the tension roller 45-6 so as to face the photoconductive belt 8. A fourth developing unit 12, a transfer unit 13 and a cleaning unit 15 are respectively provided close to the driving roller 44-6, the tension roller 46-6 and the tension roller 45-6 so as to face the photoconductive belt 8. A first laser beam 1-1 emitted from a first laser unit (not shown) is projected to a first writing position P ⑥ on the photoconductive belt 8 after traveling via a polygonal mirror 3 rotated by a motor 2, an f-$\theta$ lens 4-1 and a reflecting mirror 5. The first writing position P ⑥ is set between the charger unit 7 and the first developing unit 9. A second laser beam 1-2 emitted from a second laser unit (not shown) is projected to a second writing position Q ⑥ on the photoconductive belt 8 after traveling via the polygonal mirror 3, an f-$\theta$ lens 4-2 and reflecting mirrors 50, 51 and 52. The second writing position Q ⑥ is set between the first and second developing units 9 and 10. A third laser beam 1-3 emitted from a third laser unit (not shown) is projected to a third writing position R ⑥ on the photoconductive belt 8 after traveling via the polygonal mirror 3, an f-$\theta$ lens 4-3, and the reflecting mirrors 53, 54 and 55. The third writing position R ⑥ is set between the second and third developing units 10 and 11. A fourth laser beam 1-4 emitted from a fourth laser unit (not shown) is projected to a fourth writing position S ⑥ on the photoconductive belt 8 after traveling via the polygonal mirror 3, an f-$\theta$ lens 4-4 and a reflecting mirror 56. The fourth writing position S ⑥ is set between the third and fourth developing units 11 and 12. When the polygonal mirror 3 is rotated by the motor 2, the first, second, third and fourth laser beams 1-1, 1-2, 1-3 and 1-4 respectively scan the photoconductive belt 8 at the first, second., third, and fourth writing position P ⑥, Q ⑥, R (6), S (6). A first electrostatic latent image formed on the photoconductive belt 8 by an exposure process of the first laser beam 1-1 is developed by the first developing unit 9, so that a first toner color image is formed on the photoconductive belt 8. A second electrostatic latent image, a third electrostatic latent image, and a fourth electrostatic latent image respectively formed on the photoconductive belt 8 by exposure processes of the second, third and fourth laser beams 1-2, 1-3 and 1-4 are respectively developed by the second, third and fourth developing units in the same manner as the first latent image, so that second, third and fourth toner color images are formed on the photoconductive belt 8. The first, second, third and fourth toner color images are superposed on each other and transferred to a recording sheet 14 by the transfer unit 13. As a result, a multicolor image of the first, second, third and fourth toner color images is formed on the recording sheet 14. After this, the multicolor image is fused and fixed on the recording sheet 14 by a fixing unit (not shown). Residual toner remaining on the photoconductive belt 8 after the transferring of the toner color images is removed by the cleaning unit 15 therefrom.

Figure 18:
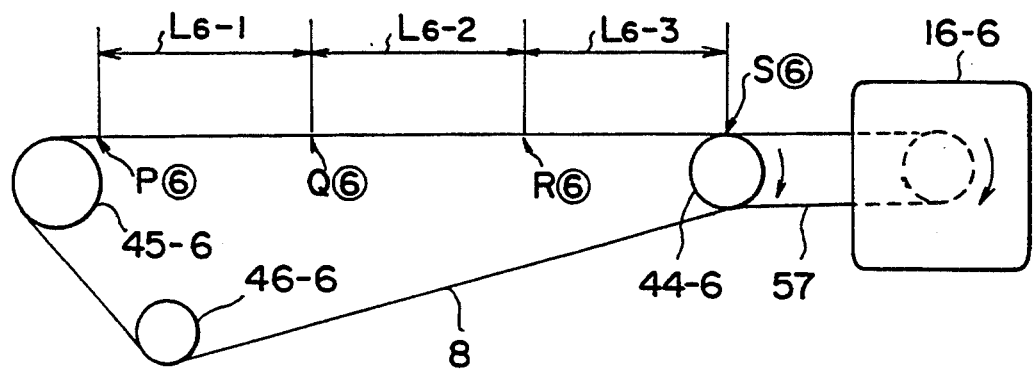
FIG. 18 is a diagram illustrating a driving mechanism for driving a photoconductive belt shown in FIG. 17.

FIG. 18 shows a driving mechanism for driving the photoconductive belt 8. Referring to FIG. 18, the photoconductive belt 8 wound around the driving roller 44-6, and the tension rollers 45-6 and 46-6 is spread by the tension rollers 45-6 and 46-6. A driving pulley mounted on a shaft of the driving motor 16-6 is coupled to a belt pulley mounted on a shaft of the driving roller 44-6 by a driving belt 57. The photoconductive belt 8 is moved by the driving motor 16-6. A first length $L_6$-1 between the first and second writing positions P (6) and Q (6), a second length $L_6$-2 between the second and third writing positions Q (6) and R (6), and a third length $L_6$-3 between the third and fourth writing positions R (6) and S (6) are respectively set as follows;

$L_6$-1 = i·$L_o$ $L_6$-2 = j·$L_o$ $L_6$-3 = k·$L_o$ where i, j and k are integers in a range of 1–4, and $L_o$ is a predetermined length referred to as a greatest common divisor length. In the sixth embodiment, i, j and k are set to 1 (i=j=k=1). That is, the first, second and third lengths $L_6$-1, $L_6$-2 and $L_6$-3 are equal to each other.

In the above optical image writing unit, the moving speed of the photoconductive belt 8 varies, as shown in FIG. 12. The cycle of the variation of the moving speed of the photoconductive belt 8 is equal to the cycle of the writing position displacement $\Delta x$ on the photoconductive belt 8. A variation of moving speed of a small roller caused by the eccentricity thereof strongly affects the moving speed of the photoconductive belt 8. Thus, the moving speed of the photoconductive belt 8 periodically varies due to the variation of the moving speed of the driving roller 44-6.

Referring to FIG. 12, when the driving roller 44-6 makes one revolution in a time $t_1$ (6), the writing position displacement $\Delta x$ on the photoconductive belt 8 periodically varies in a cycle $t_1$ (6), as indicated by the solid line 400. Here, a time in which the photoconductive belt 8 is moved the greatest common divisor length $L_o$ is denoted by $t_0$ (6). In a case where the writing position displacement $\Delta x$ periodically varies as shown by the solid line 400, the writing position displacement $\Delta x$ has a displacement value 41 (6) at a first time $T_1$, and a displacement value 42 (6) at a second time $T_2$ after n $t_0$ (6) from the first time $T_1$ has elapsed. That is, the position error $\Delta L$ (the difference between the displacement values 41 (6) and 42 (6) occurs.

The time in which the driving roller 44-6 makes one revolution is set to a time $t_2$ (6) which is one n-th of the time $t_0$ (6), where n is an integer. In this case, the writing position displacement $\Delta x$ periodically varies as shown by the chain double-dashed line 430 in FIG. 12. In the writing position displacement $\Delta x$ shown by the chain double-dashed line 430, displacement values at the first and second times $T_1$ and $T_2$ at which the electrostatic latent images are formed are equal to each other. That is, the position error $\Delta L$ is zero, so that the electrostatic latent images are formed at the same position on the photoconductive drum 8.

When the photoconductive belt 8 is driven under the following condition, the position error $\Delta L$ becomes zero.

The following formulas (33), (34) and (35) are satisfied;

$$t_0(6) = L_o/v \text{[sec]} \tag{33}$$

$$t_2(6) = \pi \cdot D/v \text{[sec]} \tag{34}$$

$$t_0(6) = n \cdot t_2(6) \tag{35}$$

where v is the moving speed of the photoconductive belt 8, and D is the diameter of the driving roller 44-46.

The formulas (33) and (34) are substituted for formula (35), and thus the following formulas (36) and (37) are obtained.

$L_o/v = n \cdot \pi \cdot D/v,$ $$L_o = n \cdot \pi D \tag{36}$$

$$D = L_o/n \cdot \pi \tag{37}$$

That is, the diameter D of the driving roller 44-6 is set so that the above formula (37) is obtained. As a result of this, the position error $\Delta L$ is equal to zero.

The allowable error of the integer n which is a ratio of the greatest common divisor length $L_o$ to the diameter D of the driving roller 44-6 is set in the same manner as the allowable error of the integer n described above.

In the second, third, fourth, fifth and sixth embodiments, a plurality of toner color images are superposed on each other on the photoconductive body (drum or belt). In these embodiment, the transfer drum 20 can also be provided so as to face the photoconductive body (drum or belt). In this case, respective toner color images are superposed on each other on the recording sheet held on the transfer drum 20.

The present invention is not limited to the aforementioned embodiments, and variations and modifications may be made without departing from the scope of the claimed invention.

What is claimed is:

1. An optical image writing unit comprising:
   a photoconductive image carrier medium;
   writing means for optically writing images periodically on said photoconductive image carrier medium at a writing interval $t_0$; and a driving mechanism, operatively coupled to said writing means, for moving said photoconductive image carrier medium so that the images are periodically written by said writing means at a predetermined area on said photoconductive image carrier medium, said driving mechanism comprising:

a drive source; and drive coupling means for rotating said photoconductive image carrier by said drive source such that a driving element of said drive coupling means makes one revolution in a time which is one n-th of the writing interval, n being an integer.

2. An optical image writing unit as claimed in claim 1, wherein said photoconductive image carrier medium is a photoconductive drum.

3. An optical image writing unit as claimed in claim 2, wherein said writing means includes a light source such that one light beam is projected onto said photoconductive drum so as to optically write the images on said photoconductive drum, and wherein said driving element has a diameter such that a revolution per unit time of said driving element is approximately n times a revolution per unit time of said photoconductive drum, whereby the time in which said driving element makes one revolution is approximately one n-th of the writing interval $t_0$.

4. An optical image writing unit as claimed in claim 2, wherein said drive source is a motor and said driving element is a first pulley mounted on a shaft of said motor, and wherein a second pulley mounted on a shaft of said photoconductive drum is coupled to said first pulley by a belt so that said photoconductive drum is rotated by rotation of said first pulley.

5. An optical image writing unit as claimed in claim 2, wherein said writing means includes a plurality of light sources for projecting a respective plurality of light beams onto said photoconductive drum so as to optically write the images on said photoconductive drum, and means for successively activating said plurality of light sources are provided such that said plurality of light beams are successively activated at the writing interval $t_0$, and wherein said driving element has a diameter such that a ratio of a revolution per unit time of said driving element to a revolution per unit time of said photoconductive drum is approximately n times of $\pi \cdot D/L$, where D is a diameter of said photoconductive drum and L is a distance between positions at which respective light beams are projected onto said photoconductive drum, whereby the time in which said driving element makes one revolution is approximately one n-th of the writing interval $t_0$.

6. An optical image writing unit as claimed in claim 1, wherein said photoconductive image carrier medium is a photoconductive belt.

7. An optical image writing unit as claimed in claim 6, wherein said writing means includes a light source such that one light beam is projected onto said photoconductive belt so as to optically write the images on said photoconductive belt, and wherein said driving element has a diameter such that a revolution per unit time of said driving element is approximately n times a revolution per unit time of said photoconductive belt and such that the time in which said driving element makes one revolution is substantially one n-th of the writing interval $t_0$.

8. An optical image writing unit as claimed in claim 6, wherein said driving element is a driving roller rotated by said drive source, and said photoconductive belt extends at least partially around said driving roller and said photoconductive belt also extends partially about tension rollers and wherein said photoconductive belt is rotated by rotation of said driving roller.

9. An optical image writing unit as claimed in claim 8, wherein said writing means includes a light source for projecting one light beam onto said photoconductive belt so as to optically write the images on said photoconductive belt, and wherein said driving roller has a diameter such that a length corresponding to n revolutions of said driving roller is approximately equal to a length of said photoconductive belt, whereby the time in which said driving roller makes one revolution is approximately one n-th of the writing interval $t_0$.

10. An optical image writing unit as claimed in claim 6, wherein said writing means includes a plurality of light sources for projecting a plurality of light beams onto said photoconductive belt so as to optically write the images on said photoconductive belt, and means for successively activating said plurality of light sources are provided such that said plurality of light beams are successively activated at the writing interval $t_0$, and wherein said driving element has a diameter such that a length corresponding to n revolutions of said driving element is approximately equal to a distance between positions to which respective light beams are projected onto said photoconductive belt, whereby the time in which said driving element makes one revolution is approximately one n-th of the writing interval $t_0$.

11. An optical image writing unit as claimed in claim 8, wherein said writing means includes a plurality of light sources for projecting a plurality of light beams onto said photoconductive belt so as to optically write the images on said photoconductive belt, and means for successively activating said plurality of light sources are provided such that said plurality of light beams are successively activated at the writing interval $t_0$, and wherein said driving roller has a diameter such that a length of an outside periphery of said driving roller is approximately one n-th of a distance between positions to which respective light beams are projected onto said photoconductive belt, whereby the time in which said driving roller makes one revolution is approximately one n-th of the writing interval $t_0$.

* * * * *